US012685302B2

(12) United States Patent
Huang et al.

(10) Patent No.: US 12,685,302 B2
(45) Date of Patent: Jul. 21, 2026

(54) FAN CAPABLE OF CATCHING FLYING MOSQUITOES

(71) Applicant: Ningbo Jiubang Electrical Technology Co., Ltd, Ningbo (CN)

(72) Inventors: Renyou Huang, Ningbo (CN); Xiangjiao Zeng, Ningbo (CN)

(73) Assignee: Ningbo Jiubang Electrical Technology Co., Ltd, Ningbo (CN)

( * ) Notice: Subject to any disclaimer, the term of this patent is extended or adjusted under 35 U.S.C. 154(b) by 0 days.

(21) Appl. No.: 19/238,611

(22) Filed: Jun. 16, 2025

(65) Prior Publication Data

US 2026/0026488 A1 Jan. 29, 2026

(30) Foreign Application Priority Data

Jul. 25, 2024 (CN) .......................... 202411004696.5

(51) Int. Cl.
A01M 1/06 (2006.01)

(52) U.S. Cl.
CPC .................................... A01M 1/06 (2013.01)

(58) Field of Classification Search
CPC ........ A01M 1/06; A01M 1/08; A01M 1/2061; A01M 1/02072
See application file for complete search history.

(56) References Cited

U.S. PATENT DOCUMENTS 12,310,349 B2 * 5/2025 Wang ...................... A01M 1/08
2016/0212984 A1 * 7/2016 Fang ..................... A01M 1/023

FOREIGN PATENT DOCUMENTS

| BR | 202016009512 U2 | * | 5/2017 | .............. A01M 1/06 |
|---|---|---|---|---|
| CA | 2688976 A1 | * | 6/2011 | .............. A01M 1/08 |
| CN | 104454620 A | * | 3/2015 | .......... A01M 13/00 |
| CN | 107125225 A | * | 9/2017 | .......... A01M 1/223 |
| CN | 212184812 U | | 12/2020 | |
| CN | 213095674 U | | 5/2021 | |
| CN | 216088452 U | | 3/2022 | |
| CN | 116098134 A | * | 5/2023 | .............. A01M 1/02 |
| EP | 237453 A | * | 2/1987 | .............. A01M 1/08 |

OTHER PUBLICATIONS

English translation (Year: 2017).*
English translation (Year: 2011).*
English translation (Year: 2015).*
English translation (Year: 1987).*
English translation (Year: 2023).*

* cited by examiner

*Primary Examiner* — Peter M Poon
*Assistant Examiner* — Danielle A Clerkley
(74) *Attorney, Agent, or Firm* — Jose Cherson Weissbrot

(57) ABSTRACT

Disclosed is a fan capable of catching flying mosquitoes, which includes a housing, a rear end of the housing being an air inlet end, a front end being an air outlet end, and an air flow chamber being provided inside the housing, where a mosquito dropping opening is provided at a front side position of a lower end of a side wall of the housing and a ventilation opening is provided at a rear side position of the lower end of the side wall of the housing, a mosquito collecting box is mounted at the lower end of the side wall of the housing, an air inlet is provided on the front side of an upper end face of the mosquito collecting box, an air outlet is provided at the rear side position, and a filter screen is provided at the air outlet of the mosquito collecting box.

10 Claims, 5 Drawing Sheets

FAN CAPABLE OF CATCHING FLYING MOSQUITOES

TECHNICAL FIELD

The present application relates to the field of fans and, more particularly, to a fan capable of catching flying mosquitoes.

BACKGROUND ART

Conventional fans currently available include a housing, with its rear end serving as an air inlet end and front end as an air outlet end, an airflow assembly is mounted at the center of the rear end face in the housing and an air flow chamber is provided in the housing, the airflow assembly includes a motor mounted at the rear end face of the housing, with fan blades mounted on the motor shaft, and the motor operates to drive the blades to rotate, generating airflow that facilitates rapid air flow for cooling purposes.

However, during hot weather when mosquitoes are present indoors, people resting or moving inside inevitably suffer from mosquito bites causing skin redness, swelling, pain, allergies, and itching, with potential disease transmission. Current mosquito elimination methods typically involve static trapping devices, such as ultraviolet or other mosquito trap lamps mounted indoors with surrounding electric grids. While these can kill mosquitoes, the mosquito corpses often fall onto floors or indoor facilities below the grids. Due to indoor air flow or human activity, the corpses become scattered, creating new contamination sources indoors.

Consequently, the inventor conducted research and improvements addressing the shortcomings of these two conventional solutions.

SUMMARY OF THE INVENTION

The present application is for an objective of enabling the fan to not only provide cooling effects but also possess mosquito-catching functionality, while simultaneously allowing centralized collection of captured mosquito corpses, thereby improving sanitation and environmental benefits.

The present application provides a fan capable of catching flying mosquitoes, and the following technical solution is adopted:

a fan capable of catching flying mosquitoes, including a housing, a rear end of the housing being an air inlet end, a front end being an air outlet end, and an air flow chamber being provided inside the housing, where a mosquito dropping opening is provided at a front side position of a lower end of a side wall of the housing and a ventilation opening is provided at a rear side position of the lower end of the side wall of the housing, a mosquito collecting box is mounted at the lower end of the side wall of the housing, and an air return chamber is provided inside the mosquito collecting box; an air inlet communicating with the mosquito dropping opening is provided on the front side of an upper end face of the mosquito collecting box, an air outlet communicates with the ventilation opening is provided on the rear side, and a mosquito blocking member is provided in the air return chamber between the air inlet and the air outlet.

In some embodiments, a mounting position for the mosquito collecting box is provided at the lower end of the side wall of the housing, a positioning fence arranged around the mounting position is provided at the lower end of the side wall of the housing, all the positioning fences are enclosed in a mounting groove of a frame-shaped structure, the air inlet is arranged at a front side of a groove bottom of the mounting groove, and the air outlet is arranged at the rear side of the groove bottom of the mounting groove; the upper end of the mosquito collecting box is fitted into the mounting groove.

In some embodiments, a first magnetic groove is provided in a middle portion of the groove bottom of the mounting groove, a first magnetic member is mounted in the first magnetic groove, and a second magnetic member is provided in a middle portion of the upper end face of the mosquito collecting box to cooperate with the first magnetic member.

In some embodiments, the mosquito collecting box includes a box body having an opening at an upper end thereof, and a baffle mounted at a rear side position of the opening of the box body, a front edge of the baffle forming an air inlet with left and right edges and a front edge of the opening of the box body, and the air outlet is provided at a rear side position of the baffle.

In some embodiments, a second magnetic groove is provided in front of the upper end face of the baffle, and the second magnetic member is mounted in the second magnetic groove.

In some embodiments, a front side wall of the box body is provided with a guide slope inclined toward the rear side.

In some embodiments, the mosquito blocking member is hingedly mounted between the left and right side walls of the box body, the left and right sides of the mosquito blocking member are respectively adjacent to the side walls of the corresponding side of the box body, and a lower edge of the mosquito blocking member is adjacent to or abuts against a lower side position of the guide slope or an inner bottom face of the box body.

In some embodiments, a mosquito blocking net is provided in the housing at a position adjacent to the front end face.

In some embodiments, the side wall of the housing is provided with a plurality of auxiliary air intake holes along the circumference at a position adjacent to the rear end face, the ventilation openings communicate with the auxiliary air intake holes at the lower end of the side wall of the housing, and a mosquito trap lamp is provided at the air inlet end of the housing.

In some embodiments, the mosquito collecting box is provided with an isolation net at the air outlet.

In summary, the present application includes at least one of the following beneficial technical effects:

1. By improving the fan structure, a mosquito trap lamp is mounted at the air inlet end of the fan housing, while a mosquito collecting box is mounted at the lower portion of the side wall, such that the mosquitoes are attracted to the air inlet end of the fan via the mosquito trap lamp. The negative pressure generated by airflow from the air inlet end to the air outlet end through the air flow chamber draws the mosquitoes into the air flow chamber, where they rapidly impact the air outlet end face, then they fall to the lower interior wall of the housing and enter the air return chamber through the air inlet for centralized collection, thus, the fan not only provides cooling effects but also possesses mosquito-catching functionality, while simultaneously allowing centralized collection of captured mosquito corpses, thereby improving sanitation and environmental benefits.

2. The mounting groove formed by the positioning fence enables quick positioning of the mosquito collecting box. The mutual magnetic between two magnetic members facilitates convenient and rapid mounting/removal of the mosquito collecting box.

3. The guide slope design is designed to allow rapid airflow redirection while simultaneously ensuring that the falling mosquitoes are swiftly carried by the airflow to the mosquito collecting area of the mosquito collecting box.

4. The mosquito blocking member is designed to prevent or reduce the likelihood of the mosquitoes escaping from the air inlet after entering the collecting area.

5. The mosquito blocking net is designed to ensure that the mosquitoes drawn into the air flow chamber rapidly impact the mosquito blocking net, effectively reducing instances where the mosquitoes are blown out through the air outlet end of the housing, which also improves precision in directing the mosquitoes to the mosquito dropping opening.

6. The auxiliary air intake holes are designed to increase air volume on one hand, while enhancing mosquito drawing efficiency on the other hand.

7. The isolation net is designed to reduce instances of the mosquitoes being blown out or escaping through the air outlet, thereby improving mosquito elimination effectiveness.

Figure 1:
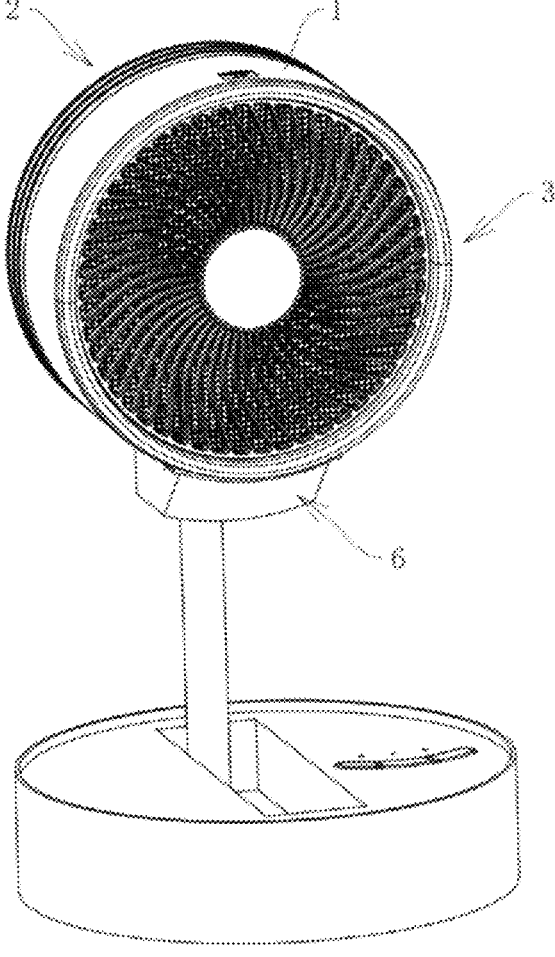
FIG. 1 is a schematic structural diagram showing a fan capable of catching flying mosquitoes according to an embodiment of the present application.

Description of reference numerals: 1. housing; 2. air inlet end; 3. air outlet end; 4. mosquito dropping opening; 5. ventilation opening; 6. mosquito collecting box; 7. air inlet; 8. air outlet; 9. isolation net; 10. auxiliary air intake hole; 11. mosquito blocking net; 12. positioning fence; 13. mounting groove; 14. first magnetic groove; 15. box body; 16. baffle; 17. second magnetic groove; 18. guide slope; 19. mosquito blocking member.

DETAILED DESCRIPTION OF THE INVENTION

The present application will be described in further detail below with reference to FIGS. 1 to 5.

The embodiment of the present application discloses a fan capable of catching flying mosquitoes, and with reference to FIG. 1, the fan includes a housing 1, where the rear end of the housing 1 is an air inlet end 2, and the front end is an air outlet end 3; an air flow chamber being provided inside the housing 1; a mosquito trap lamp (not shown in the figure) is provided at the air inlet end 2 of the housing 1; generally, a motor is mounted in the middle of the rear end face of the housing 1; the mosquito trap lamp can be designed as an annular structure and can be mounted at the peripheral position of a motor mounting position; however, the shape and mounting method of the mosquito trap lamp are not limited too much, and can be set according to actual layout requirements, as long as its main purpose is to attract the mosquitoes to the side of the air inlet end 2 of the fan.

Figure 2:
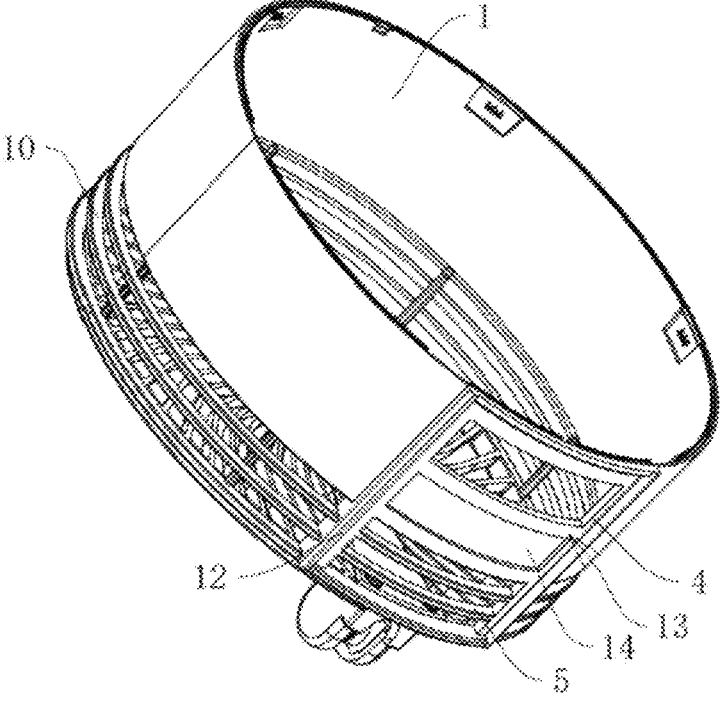
FIG. 2 is a schematic structural diagram showing a housing of a fan capable of catching flying mosquitoes according to an embodiment of the present application.
Figure 3:
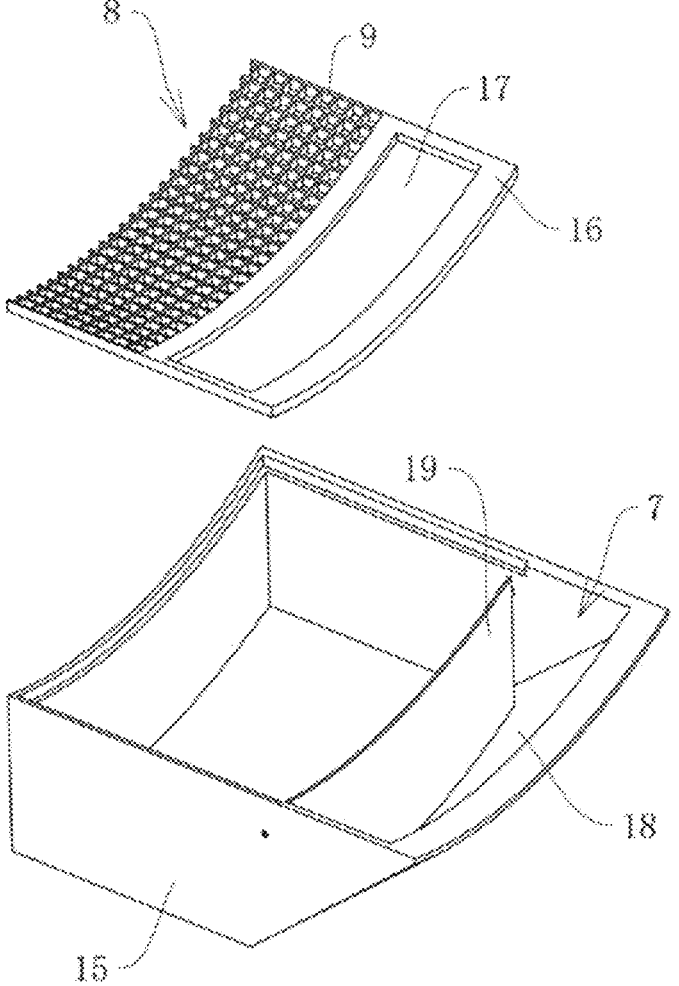
FIG. 3 is a schematic structural diagram showing an exploded structure of a mosquito collecting box in a fan capable of catching flying mosquitoes according to an embodiment of the present application.
Figure 4:
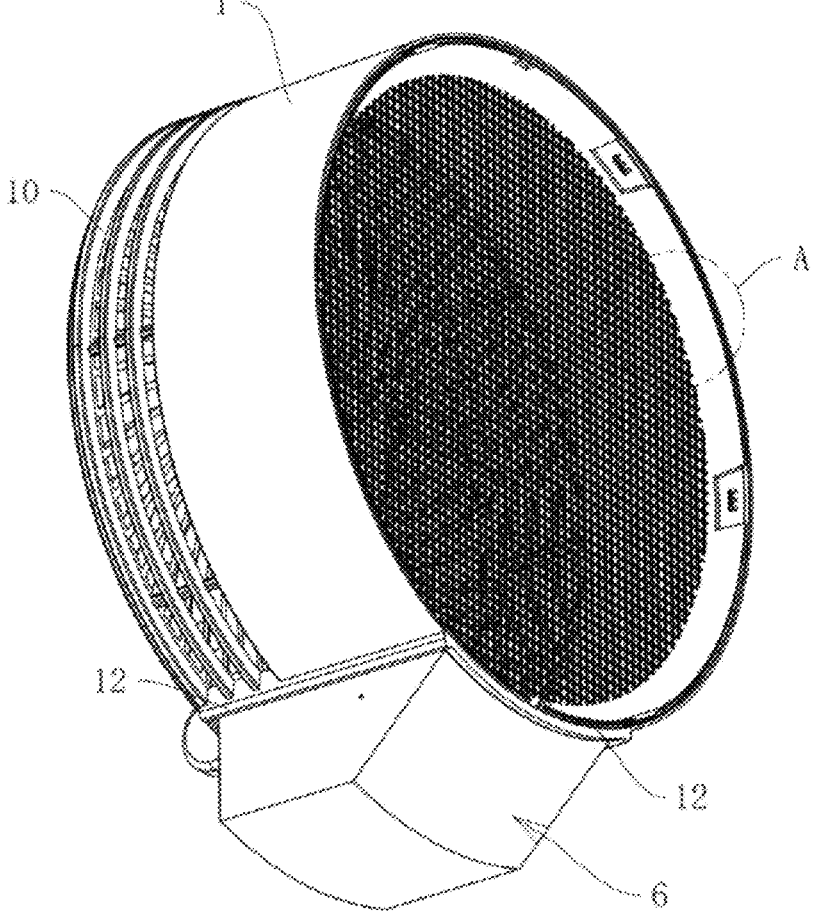
FIG. 4 is a schematic structural diagram showing a mosquito blocking net in a fan capable of catching flying mosquitoes according to an embodiment of the present application.

With reference to FIGS. 2 to 4, in order to achieve the effect of collecting the mosquitoes and catching and killing the mosquitoes, a mosquito dropping opening 4 is provided at a front side of a lower end of a side wall of the housing 1, and a ventilation opening 5 is provided at a rear side position of the lower end of the side wall of the housing; a mosquito collecting box 6 is mounted at the lower end of the side wall of the housing 1; an air return chamber is provided in the mosquito collecting box 6; an air inlet 7 communicating with the mosquito dropping opening 4 is provided at the front side of the upper end face of the mosquito collecting box 6; an air outlet 8 communicating with the ventilation opening 5 is provided at the rear side of the air return chamber; after the mosquitoes fall into the mosquito collecting box 6, since the negative pressure of a certain intensity is formed in the mosquito collecting box 6 during the continuous blowing of the fan, the air content of the mosquito collecting box 6 is relatively thin, so that the mosquitoes falling into the mosquito collecting box 6 will die quickly due to the thin air for a long time, thus achieving the effect of catching and killing the mosquitoes.

Figure 5:
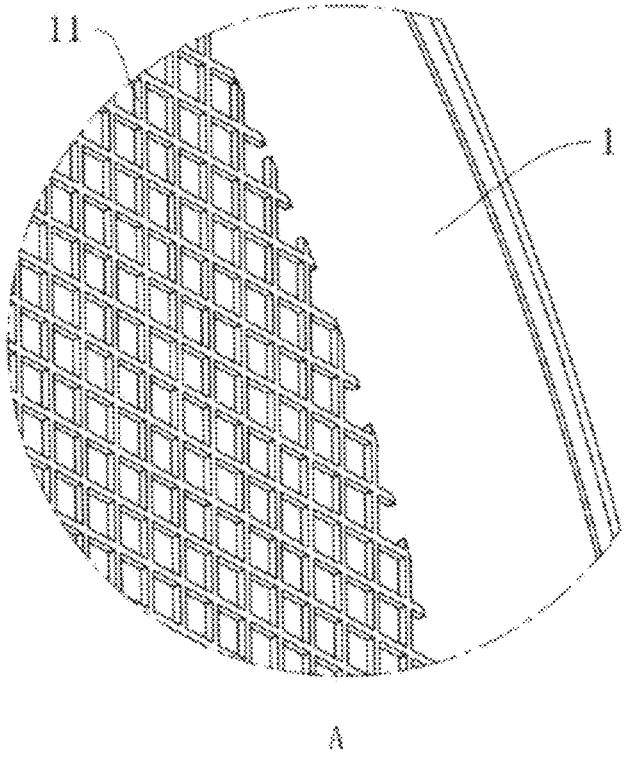
FIG. 5 is a partially enlarged schematic structural diagram of a portion A of FIG. 4.

In addition, in order to further better prevent the mosquitoes from being carried out or escaping from the air outlet 8 by the airflow passing through the air return chamber, an isolation net 9 may be provided at the air outlet 8 of the mosquito collecting box 6, and in the present embodiment, the isolation net 9 may be a filter screen or a grid-shaped filter plate, and may also be an electric mosquito net, or may be a mesh patch with glue for sticking the mosquitoes and mesh pores, and at the same time, in order to increase the air volume and improve the effect of the mosquitoes being drawn into the air flow chamber in the fan, a plurality of auxiliary air intake holes 10 are provided along the circumference at the position of the side wall of the housing 1 adjacent to the rear end face, where the ventilation opening 5 communicates with the auxiliary air intake holes 10 located at the lower end of the side wall of the housing 1, and may also be that the auxiliary air intake holes 10 located at the lower end of the side wall of the housing 1 is the ventilation opening 5; after the mosquitoes are drawn from the air inlet end 2 of the fan, the mosquitoes will rapidly impact on the end face of the air outlet end 3; however, when the fan is generally designed, the end face of the air outlet end 3 is of an umbrella-shaped design, namely, the cross section of the end face of the air outlet end 3 is of an arc-shaped shape; therefore, in order to further lift the position where the mosquitoes can fall to the mosquito dropping opening 4 more quickly after impact, with reference to FIG. 5, a mosquito blocking net 11 can be provided in the housing 1 at a position adjacent to the front end face, and the mesh of the mosquito blocking net 11 is generally relatively dense, so that the phenomenon that the mosquitoes are blown out of the air outlet end 3 can be reduced, so that the mosquito blocking effect is better.

In the present embodiment, in order to achieve the effects of quick assembly and disassembly of the mosquito collecting box 6 and easy cleaning, an mounting position of the mosquito collecting box 6 is provided at the lower end of the side wall of the housing 1, a positioning fence 12 is provided at the lower end of the side wall of the housing 1 around the mounting position, all the positioning fences 12 are enclosed in a mounting groove 13 of a frame-shaped structure, an air inlet 7 is provided at the front side of the groove bottom of the mounting groove 13, and an air outlet 8 is provided at the rear side of the groove bottom of the mounting groove 13; the upper end of the mosquito collecting box 6 is adapted to be mounted in the mounting groove 13, and in order to enable quick mounting and dismounting, a first magnetic groove 14 may be provided in the middle of the groove bottom of the mounting groove 13, a first magnetic member (not shown in the figure) may be mounted in the first magnetic groove 14, and a second magnetic member (not shown in the figure) cooperating with the first magnetic member may be provided in the middle of the upper end face of the mosquito collecting box 6, the magnetic members in the present embodiment may be magnets attracting each other, or one of them may be a magnet, and the other one may be a sheet iron or a sheet steel.

In the present embodiment, in order to facilitate the cleaning of the mosquito corpses in the mosquito collecting box 6, the mosquito collecting box 6 can be designed as an assembly, namely, the mosquito collecting box 6 includes a box body 15 with an opening at the upper end and a baffle 16, the air return chamber is in the box body 15, the baffle 16 is mounted at the rear side position of the opening of the box body 15, and the front edge of the baffle 16 and the left and right edges and the front edge of the opening of the box body 15 form an air inlet 7; in addition, a second magnetic groove 17 may be provided at a position on the front side of the upper end face of the baffle 16, and a second magnetic member may be mounted in the second magnetic groove 17, and the air outlet 8 may be provided at a position on the rear side of the baffle 16.

In order to facilitate that the mosquitoes can be quickly guided to the mosquito collecting position of the mosquito collecting box 6, the front side wall of the box body 15 is provided with a guide slope 18 inclined in the rear direction, and in order to prevent the mosquitoes from escaping from the air inlet 7, the mosquito blocking member 19 can be provided in the air return chamber between the air inlet 7 and the air outlet 8. In the present embodiment, the mosquito blocking member 19 is of a plate-shaped structure, and the left and right edges thereof are respectively provided with rotating shafts, and the mosquito blocking member 19 can be hingedly mounted between the left and right side walls of the box body 15, and the rotating shafts are rotatably mounted on the side walls of the box body 15 on the corresponding sides. However, in the present embodiment, the left and right sides of the mosquito blocking member 19 are respectively adjacent to the side wall of the corresponding side of the box body 15, so that a small gap is generated between the side of the mosquito blocking member 19 and the corresponding side wall of the box body 15, on one hand, the swinging of the mosquito blocking member 19 is not hindered, and on the other hand, the effect of preventing the mosquitoes from escaping can be achieved, and at the same time, the lower edge of the mosquito blocking member 19 is adjacent to or abuts against the lower side position of the guide slope 18 or the inner bottom face of the box body 15, and in the present embodiment, the inner cavity of the box body 15 at the rear side of the mosquito blocking member 19 can be understood as a mosquito collecting place; in addition, the mosquito blocking member 19 can also be designed with an electric mosquito net, or a structure with a glue for sticking the mosquitoes and a mesh patch with a mesh, so that when the mosquitoes fall behind, the effect of catching and killing the flying mosquitoes can be directly achieved.

Disclosed in an embodiment of the present application is a fan capable of catching flying mosquitoes, when the fan is started to operate, a mosquito trap lamp will attract the mosquitoes to one side of an air inlet end 2 of the fan, and due to a negative pressure formed by the operation of the fan, the mosquitoes will be drawn into an air flow chamber in the fan, and the mosquitoes will be quickly hit on a mosquito blocking net 11 and then fall to a mosquito dropping opening 4; due to a negative pressure generated by the air flow in an air return chamber, the mosquitoes will be drawn into a mosquito collecting box 6, and when a negative pressure is generated in the air return chamber, a mosquito blocking member 19 will swing backwards to be in an open state, the mosquitoes are brought into the mosquito collecting place from the gap between the lower edge portion of the mosquito blocking member 19 and the inner bottom face of the box body 15, thereby achieving a concentrated mosquito catching and killing effect.

It should be noted that the directional terms such as front, rear, left, right, up, and down mentioned in this embodiment are all described based on the normal orientation of the fan during mounting and use.

The above describes preferred embodiments of the present application, which are not intended to limit the scope of protection of the present application. Therefore, any equivalent modifications made based on the structure, shape, or principle of the present application shall fall within the protection scope of the present application.

The invention claimed is:

1. A fan capable of catching flying mosquitoes, comprising a housing (1), a rear of the housing (1) being an air inlet end (2), a front of the housing (1) being an air outlet end (3), and an air flow chamber being provided inside the housing (1), wherein a mosquito dropping opening (4) is provided at a front side position of a lower end of a side wall of the housing (1) and a ventilation opening (5) is provided at a rear side position of the lower end of the side wall of the housing, a mosquito collecting box (6) is mounted at the lower end of the side wall of the housing (1), and an air return chamber is provided inside the mosquito collecting box (6); an air inlet (7) that communicates with the mosquito dropping opening (4) is provided on a front side of an upper end face of the mosquito collecting box (6), an air outlet (8) that communicates with the ventilation opening (5) is provided on a rear side of the upper end face of the mosquito collecting box (6), and a mosquito blocking member (19) is provided in the air return chamber between the air inlet (7) and the air outlet (8); the air return chamber is configured to allow airflow to enter from the air inlet (7) and exit from the air outlet (8);

wherein the mosquito collecting box (6) comprises a box body (15) having an opening at an upper end thereof, and a baffle (16) mounted at a rear of the opening of the box body (15), a front edge of the baffle (16) forming the air inlet (7), the air inlet (7) being aligned with both left and right edges and a front edge of the opening of the box body (15), and the air outlet (8) is provided at a rear end of the baffle (16);

wherein a front side of an upper face of the baffle (16) includes a magnetic groove (17), and a magnetic member is mounted in the magnetic groove (17).

2. The fan capable of catching flying mosquitoes according to claim 1, wherein a mounting position for the mosquito collecting box (6) is provided at the lower end of the side wall of the housing (1), a positioning fence (12) arranged around the mounting position is provided at the lower end of the side wall of the housing (1), all the positioning fences (12) are enclosed in a mounting groove (13) of a frame-shaped structure, the air inlet (7) is arranged at a front side of a groove bottom of the mounting groove (13), and the air outlet (8) is arranged at the rear side of the groove bottom of the mounting groove (13); the upper end of the mosquito collecting box (6) is fitted into the mounting groove (13).

3. The fan capable of catching flying mosquitoes according to claim 2, wherein a first magnetic groove (14) is provided in a middle portion of the groove bottom of the mounting groove (13), a first magnetic member is mounted in the first magnetic groove (14), and a second magnetic member is provided in a middle portion of the upper end face of the mosquito collecting box (6) to cooperate with the first magnetic member.

4. The fan capable of catching flying mosquitoes according to claim 1, wherein a front side wall of the box body (15) is provided with a guide slope (18) inclined toward a rear side of the box body (15).

5. The fan capable of catching flying mosquitoes according to claim 4, wherein the mosquito blocking member (19) is hingedly mounted between a left side wall and a right side wall-of the box body (15), a left side and a right side of the mosquito blocking member (19) are respectively adjacent to the left side wall and the right side wall of the box body (15), and a lower edge of the mosquito blocking member (19) is adjacent to or abuts against a lower side position of the guide slope (18) or an inner bottom face of the box body (15).

6. The fan capable of catching flying mosquitoes according to claim 1, wherein a mosquito blocking net (11) is provided in the housing (1) at a position adjacent to the air outlet end (3).

7. The fan capable of catching flying mosquitoes according to claim 1, wherein the side wall of the housing (1) is provided with a plurality of auxiliary air intake holes (10) along the circumference at a position adjacent to the air inlet end (2), the ventilation opening (5) communicates with the auxiliary air intake holes (10) at the lower end of the side wall of the housing (1), and a mosquito trap lamp is provided at the air inlet end (2) of the housing (1).

8. The fan capable of catching flying mosquitoes according to claim 1, wherein the mosquito collecting box (6) is provided with an isolation net (9) at the air outlet (8).

9. A fan capable of catching flying mosquitoes, comprising a housing (1), a rear of the housing (1) being an air inlet end (2), a front of the housing (1) being an air outlet end (3), and an air flow chamber being provided inside the housing (1), wherein a mosquito dropping opening (4) is provided at a front side position of a lower end of a side wall of the housing (1) and a ventilation opening (5) is provided at a rear side position of the lower end of the side wall of the housing, a mosquito collecting box (6) is mounted at the lower end of the side wall of the housing (1), and an air return chamber is provided inside the mosquito collecting box (6); an air inlet (7) that communicates with the mosquito dropping opening (4) is provided on the front side of an upper end face of the mosquito collecting box (6), an air outlet (8) that communicates with the ventilation opening (5) is provided on a rear side of the upper end face of the mosquito collecting box (6), and a mosquito blocking member (19) is provided in the air return chamber between the air inlet (7) and the air outlet (8);

wherein the mosquito collecting box (6) comprises a box body (15) having an opening at an upper end thereof, and a baffle (16) mounted at a rear of the opening of the box body (15), a front edge of the baffle (16) forming an air inlet (7), the air inlet (7) being aligned with both left and right edges and a front edge of the opening of the box body (15), and the air outlet (8) is provided at a rear end of the baffle (16); and wherein a front side of an upper face of the baffle (16) includes a magnetic groove (17), and a magnetic member is mounted in the magnetic groove (17).

10. A fan capable of catching flying mosquitoes, comprising a housing (1), a rear of the housing (1) being an air inlet end (2), a front of the housing (1) being an air outlet end (3), and an air flow chamber being provided inside the housing (1), wherein a mosquito dropping opening (4) is provided at a front side position of a lower end of a side wall of the housing (1) and a ventilation opening (5) is provided at a rear side position of the lower end of the side wall of the housing, a mosquito collecting box (6) is mounted at the lower end of the side wall of the housing (1), and an air return chamber is provided inside the mosquito collecting box (6); an air inlet (7) that communicates with the mosquito dropping opening (4) is provided on the front side of an upper end face of the mosquito collecting box (6), an air outlet (8) that communicates with the ventilation opening (5) is provided on a rear side of the upper end face of the mosquito collecting box (6), and a mosquito blocking member (19) is provided in the air return chamber between the air inlet (7) and the air outlet (8);

wherein the mosquito collecting box (6) comprises a box body (15) having an opening at an upper end thereof, and a baffle (16) mounted at a rear of the opening of the box body (15), a front edge of the baffle (16) forming an air inlet (7), the air inlet (7) being aligned with both left and right edges and a front edge of the opening of the box body (15), and the air outlet (8) is provided at a rear end of the baffle (16);

wherein the mosquito blocking member (19) is hingedly mounted between the left and right side walls of the box body (15), the left and right sides of the mosquito blocking member (19) are respectively adjacent to the side walls of the corresponding side of the box body (15), and a lower edge of the mosquito blocking member (19) is adjacent to or abuts against a lower side position of the guide slope (18) or an inner bottom face of the box body (15).

* * * * *